United States Patent
Cho (10) Patent No.: US 8,420,972 B2
(45) Date of Patent: Apr. 16, 2013

(54) METHOD OF MACHINING MASTER LINK

(75) Inventor: Bum Je Cho, Gyeongnam-Do (KR)

(73) Assignee: Daechang Forging Co., Ltd. (KR)

( * ) Notice: Subject to any disclaimer, the term of this patent is extended or adjusted under 35 U.S.C. 154(b) by 946 days.

(21) Appl. No.: 12/493,129

(22) Filed: Jun. 26, 2009

(65) Prior Publication Data

US 2009/0276079 A1 Nov. 5, 2009

Related U.S. Application Data

(63) Continuation of application No. PCT/KR2007/002238, filed on May 7, 2007.

(30) Foreign Application Priority Data

Feb. 8, 2007 (KR) .................. 10-2007-0013413

(51) Int. Cl.
B23H 9/00 (2006.01)

(52) U.S. Cl.
USPC ............... 219/69.12; 219/69.17; 305/202

(58) Field of Classification Search ............ 219/69.12, 219/69.17; 72/405.16; 198/774.1; 305/202–204; 59/7
See application file for complete search history.

(56) References Cited

U.S. PATENT DOCUMENTS

| | | | | |
|---|---|---|---|---|
| 4,407,404 A | * | 10/1983 | Rise et al. | 198/774.1 |
| 4,455,054 A | * | 6/1984 | Brunn | 305/202 |
| 5,700,384 A | * | 12/1997 | Marchand et al. | 219/69.12 |
| 6,270,173 B1 | * | 8/2001 | Hashimoto et al. | 305/202 |
| 6,886,323 B2 | * | 5/2005 | Yamamoto | 59/7 |
| 2003/0101711 A1 | * | 6/2003 | Yamamoto | 59/7 |

FOREIGN PATENT DOCUMENTS

| | | |
|---|---|---|
| JP | 2004-082249 | 3/2004 |
| KR | 10-2003-0015027 | 2/2003 |

* cited by examiner

*Primary Examiner* — Jeffrey A Gaffin
*Assistant Examiner* — Douglas Lee
(74) *Attorney, Agent, or Firm* — Park & Associates IP Law, P.C.

(57) ABSTRACT

The present invention relates to a method of machining a master link disposed at a distal end of a chain and constituting a part of a track chain link of a lower driving device used in an endless track vehicle (a bulldozer, an excavator). According to the present invention, it is possible to rapidly perform the machining work by secondarily adjusting the horizontal degree and the vertical degree of the integrally manufactured front and rear master link in a short time after primarily wire cutting it by using an exclusive clamping jig for the primary wire cut and an exclusive clamping jig for the secondary machining center, and machine the interference portion generated at the time of the assembly of the master link with the corresponding product, by using the machining center provided with the ball end mill, the flat end mill, and the chamfer end mill, in a short time, thereby achieving reduction of the machining time, maintaining the uniform quality and reduction of the production expense.

3 Claims, 9 Drawing Sheets

PRIOR ART

FIG. 1

PRIOR ART

FIG. 2 assembly gap is secured by the primary and secondary cutting using the wire cut

PRIOR ART

METHOD OF MACHINING MASTER LINK

REFERENCE TO RELATED APPLICATIONS

This a continuation of pending International Patent Application PCT/KR2007/002238 filed on May 7, 2007, which designates the United States and claims priority of Korean Patent Applications No. 10-2007-0013413 filed on Feb. 8, 2007, the entire contents of which are incorporated herein by reference.

FIELD OF THE INVENTION

The present invention relates to a method of machining a master link, and more particularly, to a method of machining a master link disposed at a distal end of a chain as a part of a track chain link of a lower driving device used in an endless track vehicle (a bulldozer, an excavator), the master link being adapted to connect a distal end to a distal end when assembling the chain to the vehicle, so as to machine an interference portion of generated at the time of the assembly of the master link with a secondary corresponding product.

BACKGROUND OF THE INVENTION

In general, a master link for use in the connection of an end of a chain of a track chain link in an endless track vehicle, is firmly assembled to an distal end of the chain by means of a respective assembling components such as a pin, bush, a group of seals, and the like after performing heating, forging, through hardening, machining, and a high frequency work for a heated material, so that the master link is easy to assemble and secure sufficient strength.

However, despite its excellent assemblability, since the master link is difficult to manufacture and is high priced, it is used in the endless track vehicles such as the bulldozer that is applied with a big load and has a long corrosion exchange period.

The master link for the endless track vehicle is constructed to be disposed at a right side and a left side to form one pair, and is assembled after being divided into a front side and a rear side.

Also, the master link is manufactured through the following processes after being constructed as an integral type of the front and rear master links: heating of the material, hot forging, through hardening, primary cutting of both surfaces, boring of a press-fitting portion of the pin and a bush, drilling of a locking portion, high frequency treatment of a movement wear portion, primary cutting of a separation portion of the front and rear master link, secondary cutting of the separation portion, and tapping of a locking portion thereof.

Figure 1:
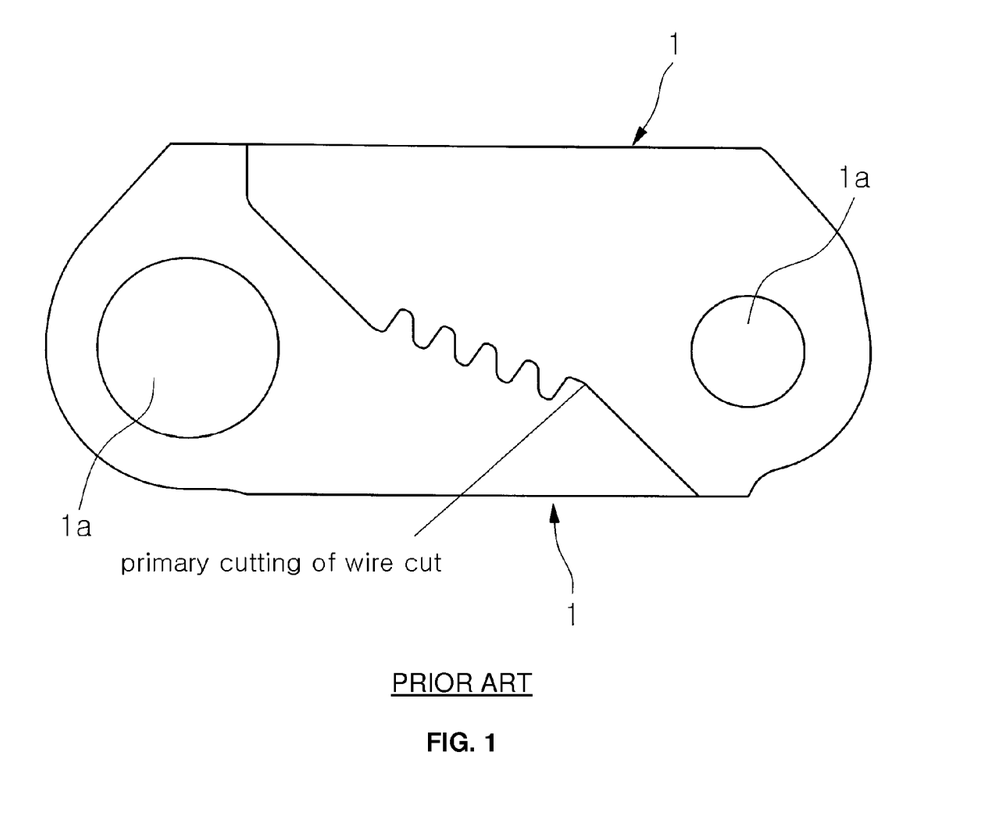
FIG. 1 is a view showing a process of primary wire cutting out for a separated machining of an integrally manufactured front and rear master link in a conventional machining of the master link.
Figure 2:
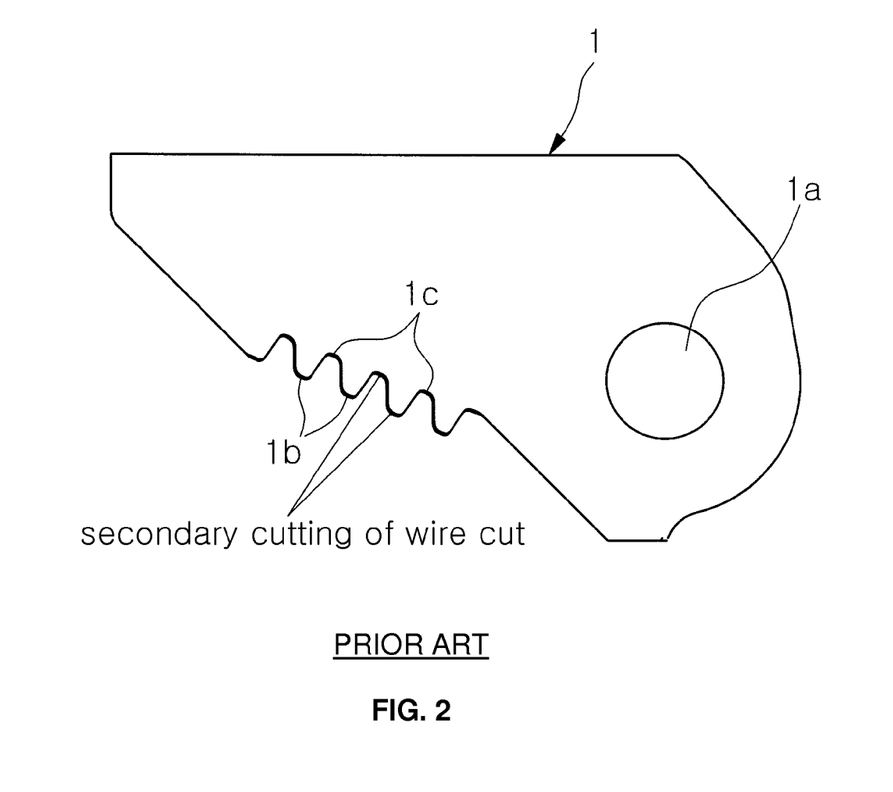
FIG. 2 a view showing a process of secondary wire cutting for securing a gap between a corresponding assembly portion of the conventional primary wire cut master link.
Figure 3:
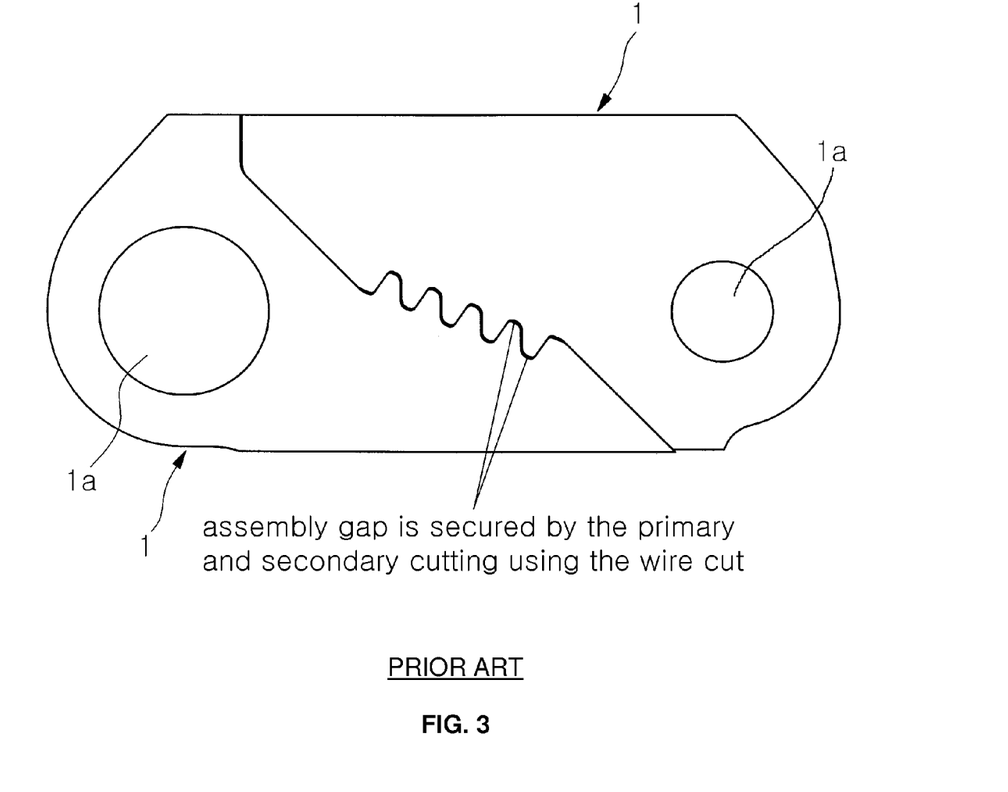
FIG. 3 is a view of an assembly state of a corresponding master link manufactured by the conventional primary and secondary wire cut processes.

Herein, the separation of the front and rear master links are performed such that a machined portion is cut by means of a wire cutting process in terms of the property of the machined portion (see FIG. 1), and are generally subjected to the second wire cutting work so as to secure a gap between the master link and the corresponding assembly portion (see FIG. 3) also.

However, since the machining speed of the wire cutting method was slow, and the cutting equipment is expensive, there has occurred a problem in that the machining expense was too high.

SUMMARY OF THE INVENTION

Accordingly, the present invention has been made to provide a novel method of machining the master link, which is capable of solving such problems of the conventional machining method of the master link as described above, and it is an object of the present invention to provide a method of machining a master link, which is capable of drastically reducing the secondary machining time of the master link, improving the quality of the product, and reducing the production expense by performing a method of wire cutting and a method of mechanical machining by means of a machining center simultaneously, since machining speed of the secondary wire cutting work was slow, while the secondary wire cutting work was performed to secure a gap between a corresponding assembly portion when performing the cutting by means of the wire cutting due to the particular property of the machining portion at the time of the separating machining of the front and the rear master links.

To achieve the above object, the present invention provides a method of machining a master link disposed at distal end of a chain used as a part of a track chain link for an endless track vehicle, for connecting both ends of the chain when assembling it to the vehicle, the master link being constructed integrally and manufactured through heating of material, hot forging, through hardening, primary cutting of both surfaces, boring of a press-fitting portion of a pin and a bush, drilling of a locking portion, high frequency treatment of a movement wear portion, primary cutting of a separation portion of the front and rear master link, secondary cutting of the separation portion, and tapping of a locking portion, the method comprising the steps of securing the master link by means of bolts and washers after engaging the master link with the integral type pin secured to a reference pin supporter of the clamping jig via an engagement hole of the master link to perform cut machining of an interference portion generated at the time of the assembly of the master link with a corresponding product; adjusting an angle block for adjusting a horizontal degree and a vertical degree of an upper machining portion of the master link secured to the pin by using an adjusting screw; machining an interference groove portion of a distal end of a gear tooth of the corresponding master link by using a ball end mill mounted to a machining center, when machining the master link clamped by a clamping jig; machining a distal end of the gear tooth, where the interference of the groove portion of the gear tooth of the corresponding master link is generated, by using a flat end mill; and removing sharp edge of the gear tooth by using a chamfer end mill.

Therefore, according to the present invention, it is possible to perform the machining work quickly by secondarily adjusting the horizontal degree and the vertical degree of the integrally manufactured front and rear master link in a short time after primarily wire cutting it by using an exclusive clamping jig for the primary wire cut and an exclusive clamping jig for the secondary machining center, and machine the interference portion generated at the time of the assembly of the master link with the corresponding product, by using the machining center provided with the ball end mill, the flat end mill, and the chamfer end mill, in a short time, thereby achieving reduction of the machining time, maintaining the uniform quality and reduction of the production expense, so that several advantages such as securing the international competitiveness of the master link, can be achieved.

DETAILED DESCRIPTION OF THE INVENTION

Hereinafter, the preferred embodiment of the present invention will be described in detail with reference to the appended drawings.

The present invention provides a method of machining a master link, which can achieve the reduction of the production time and cost, and improving the quality of the product with respect to a process requiring a long machining time and a production cost among the machining processes of the master link.

In other words, the method of machining the master link for the endless track vehicle of the present invention comprises hot forging a rolled material in a blocker mold and a finisher mold mounted to a forging press after heating it to 1250° C., performing a removal of flashes for the forged product performed of a primary hot forging at a trimming press, performing a quenching and a tempering, which are rough heat treating processes, thereby achieving a desired strength, and then performing a mechanical machining of the resultant product.

The present invention is characterized by providing a method of machining a master link, which employs a wire cutting process, and high speed machining capacity of a machining center, wherein one side of the master link 1, which is primarily wire-cut, is secured by using a device which can easily adjust a horizontal degree and a vertical degree and secure it, and it can be machined in a very short time by using tools (such as a ball end mill, a flat end mill, and a chamfer end mill), which can be easily used to machine an interference portion of assembly.

Hereinafter, the present invention will be described in more detail with reference to the construction of a device used in the method of machining the master link of the present invention.

Figure 4:
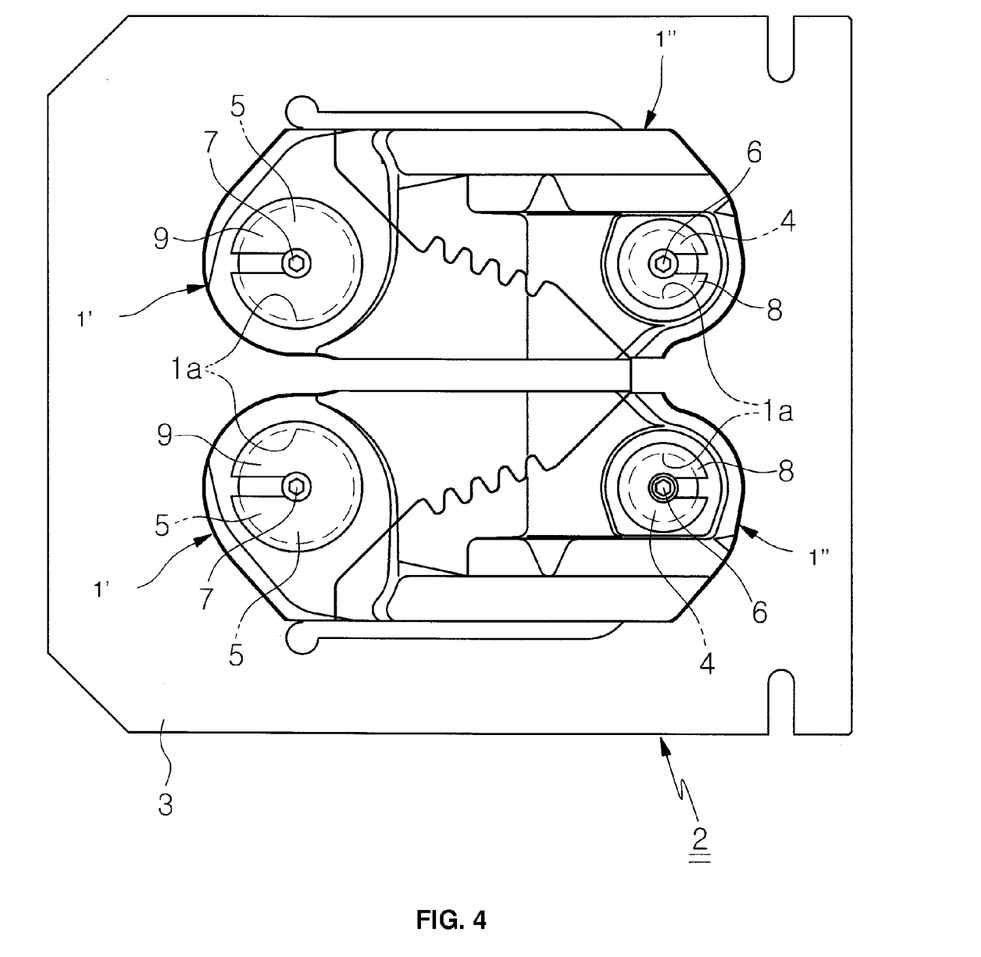
FIG. 4 is a planar view of a clamping jig for primary wire cut used in the machining method of the master link of the present invention.
Figure 5:
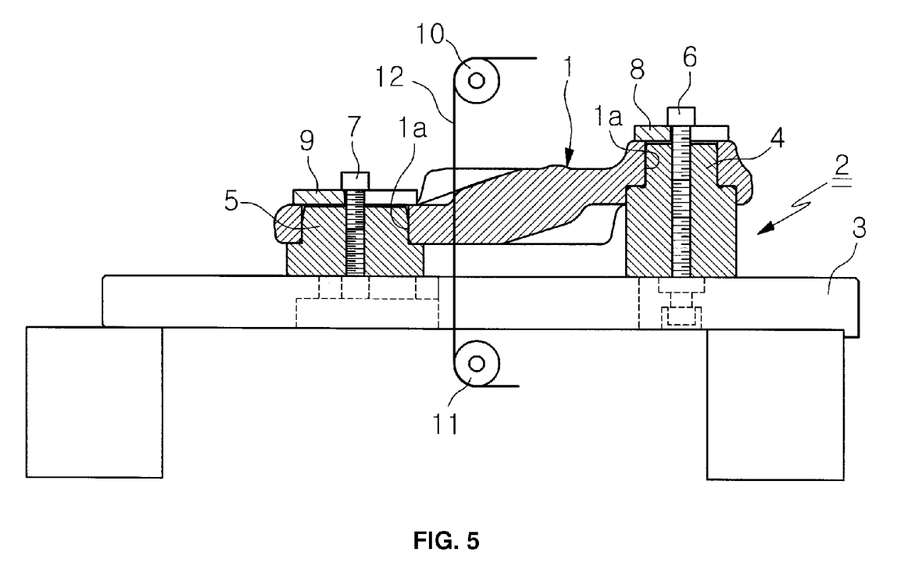
FIG. 5 is a front view of a clamping jig for primary wire cut used in the machining method of the master link of the present invention.
Figure 6:
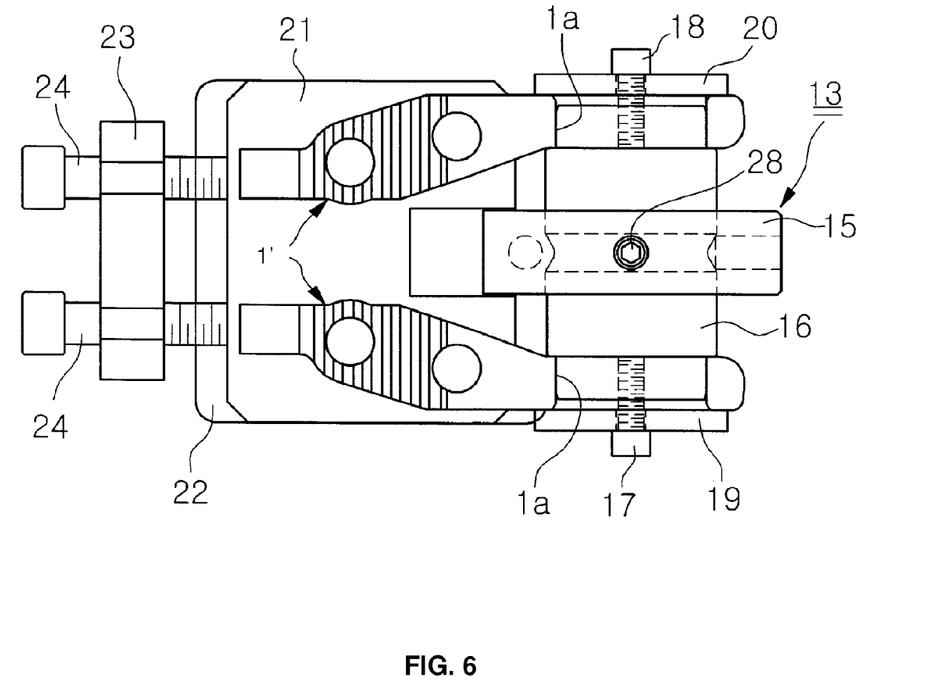
FIG. 6 is a planar view of a clamping jig for a secondary machining center used in the machining method of the master link of the present invention.
Figure 7:
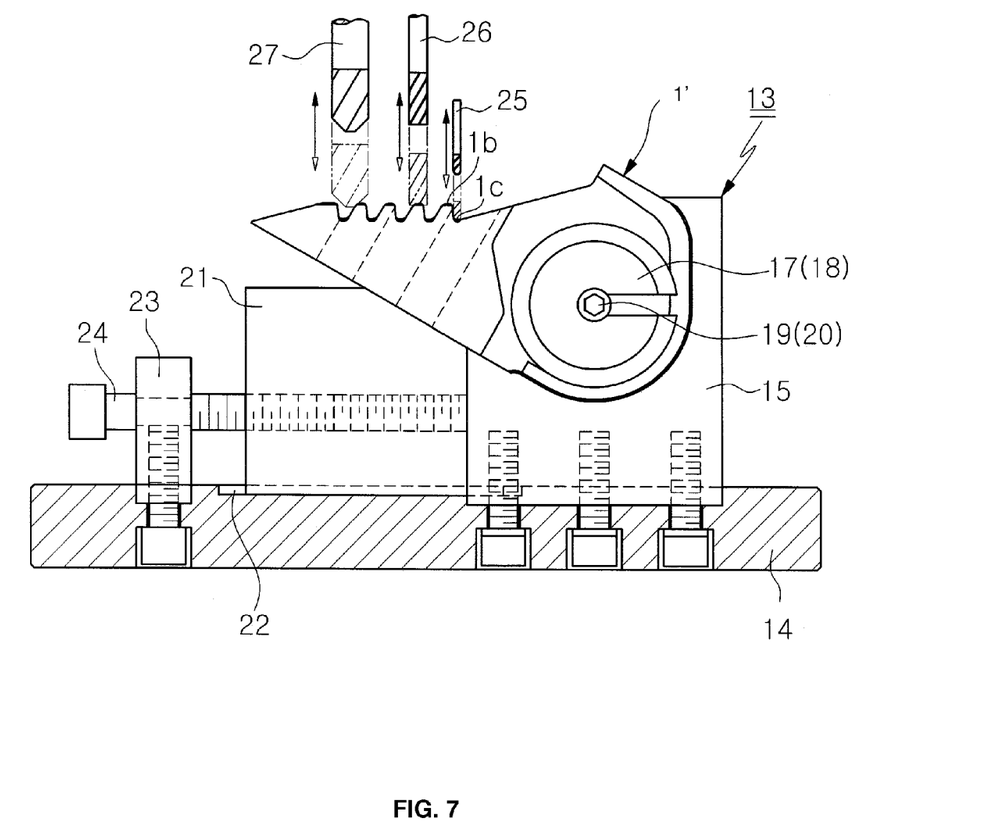
FIG. 7 is a front view of a clamping jig for a secondary machining center used in the machining method of the master link of the present invention.
Figure 8:
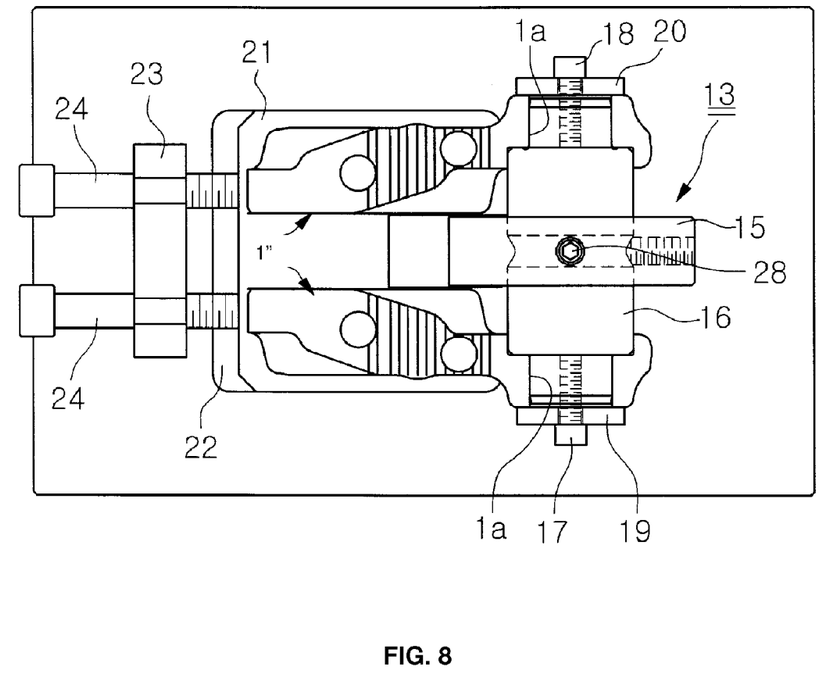
FIG. 8 is a planar view of a clamping jig for a secondary machining center used in the machining method of the master link of the present invention.
Figure 9:
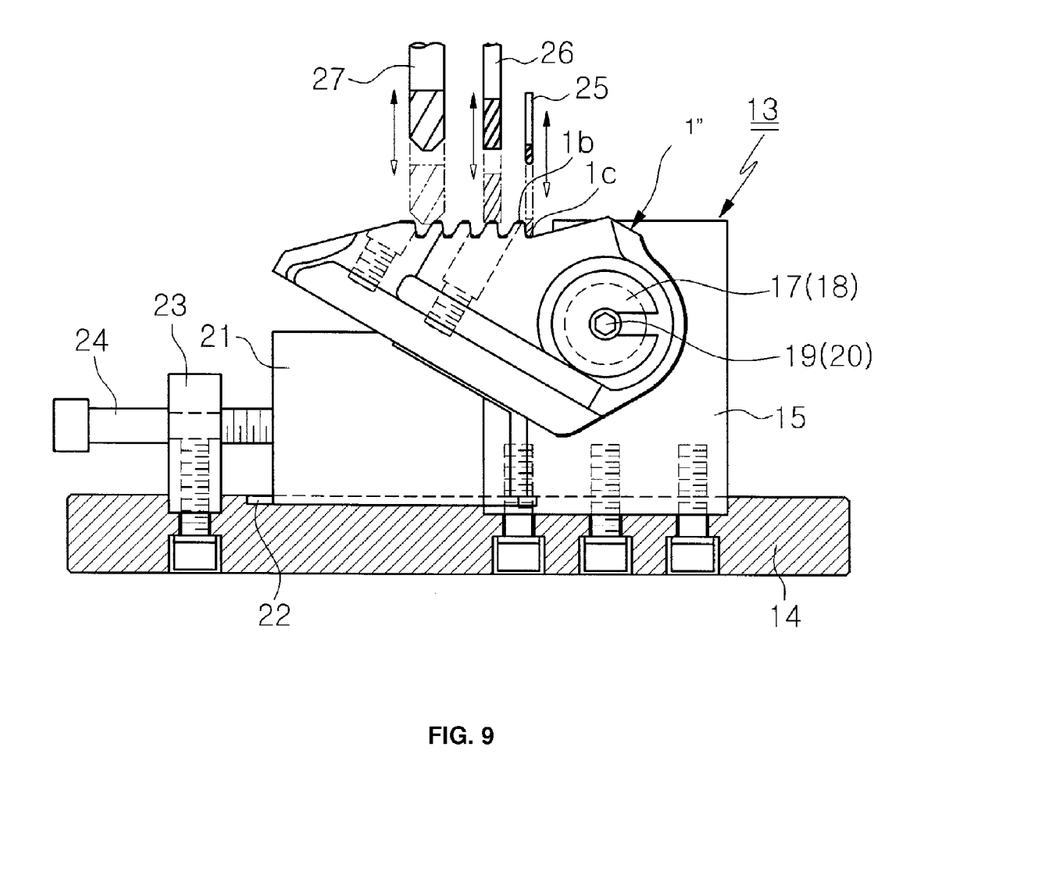
FIG. 9 is a front view of the clamping jig or the secondary machining center used in the method of machining the master link of the present invention.

FIGS. 4 and 5 are planar view and front view for explaining the method of machining a master link, and a first clamping jig 2 for use in wire cutting.

The first clamping jig 2 is constructed such that first vertical shafts 4 are disposed at one side to act as a reference point for securing at least one process master link 1 to the first clamping jig 2, with second vertical shafts 5 disposed at the opposite side to maintain a horizontal position of the process master links 1 as shown in the drawings.

After aligning the shafts 4 and the shafts 5 with an engagement hole 1a of each process master link 1, the process master links 1 are secured to the left and right sides of a base plate 3 by using bolts 6, 7 and washers 8, 9.

Thus, the wire cutting work is performed to the two process master links 1 secured in parallel to the clamping jig 2, by using a cutting wire 12 guided by guide rollers 10, 11, thereby to divide the process master links land produce four master links 1' and 1".

Then, the resultant master links 1' and 1" are mounted to a machining center (not shown) to perform high speed machining processes, using a second clamping jig 13 as shown in FIGS. 6 to 9.

The second clamping jig 13 is constructed such that a reference pin supporter 15 is disposed at an upper side of the base plate 14 to secure at least two master links 1' and 1", and an integral pin 16 is disposed on the supporter 15 to secure the master links 1' and 1" in their right positions at the front and back thereof, so that the engagement hole 1a of the master link 1' and 1" is engaged with the pin 16 and secured by means of the bolts 17, 18 and the washers 19, 20.

In addition, an angle block 21 for adjusting a horizontal degree and a vertical degree of a machining portion of the master link 1 is disposed at one side of the supporter 15 so that it is thread-engaged with a adjusting screw 24 disposed on a support block 23 of the adjusting screw, so that it can be adjusted to the right and left along a guide rail 22 provided on the base plate 14.

The machining of an engagement surface of the master link 1, which is secured to the clamping jig 13 disposed at the machining center with the horizontal degree and the vertical degree adjusted, will be performed as follows.

In other words, a groove portion 1c, wherein the interception is occurred, of an distal end of a gear tooth 1b of the corresponding master link 1 is machined by using a first ball end mill 25, and a distal end of the gear tooth 1b, wherein the interception is produced by the groove portion 1c of the gear tooth 1b of the corresponding master link 1, is machined by using a second ball end mill 26, and a sharp edge of the gear tooth 1b is removed by using a third chamfer end mill 27, thereby accomplishing the machining work of the master link 1.

Drawing numeral 28 in the drawings represents for a bolt for securing the pin 16 to the supporter 15.

As described above, according to the present invention, it is possible to achieve several advantages such as reducing the machining time, minimizing the occurrence of the inferior products, reducing the production expense, and the like by machining the interference portion of assembly in a short time by using the ball end mill, the flat end mill, and the chamfer end mill after hot forging a rolled material for making the master link 1 in the forging press, removing flashes in the trimming press, performing the through hardening of the resultant product, and then securing one side of the master link 1, which has been primarily wire-cut, to the clamping jig 13, which is easy of adjusting the horizontal degree and the vertical degree and securing it.

For the reference, the machining time at the secondary machining center used in the machining method of the master link according to the present invention was reduced to be ¹⁄₁₀ of the machining time using the conventional wire cutting, and it was confirmed that the production expense could be reduced by ½.

Industrial Applicability

As described above, according to the method of machining the master link of the present invention, it is possible to perform the machining work quickly by secondarily adjusting the horizontal degree and the vertical degree of the integrally manufactured front and rear master link in a short time after primarily wire cutting it by using an exclusive clamping jig for the primary wire cut and an exclusive clamping jig for the secondary machining center, and machine the interference portion generated at the time of the assembly of the master link with the corresponding product, by using the machining center provided with the ball end mill, the flat end mill, and the chamfer end mill, in a short time, thereby achieving reduction of the machining time, maintaining the uniform quality and reduction of the production expense, so that several advantages can be expected such as securing the international competitiveness of the master link.

What is claimed is:

1. A method of machining a master link for a track chain link of an endless track vehicle, comprising:
   producing process master links, each of said process master links having two engagement holes;
   securing a plurality of process master links to a first clamping jig, the first clamping jig having first and second vertical shafts, and each of said process master links placed in horizontally parallel relation with one another and with the first and second vertical shafts engaged with the engagement holes of the process master links;
   wire-cutting the horizontally-arranged process master links to divide them and thereby provide a plurality of first master links and a plurality of second master links
   securing the first or second master links to a second clamping jig, the second clamping jig mounted on a machining center and having a horizontally-oriented integral pin, and each of said first or second master links placed in horizontally parallel relation with one another and with the horizontally-oriented integral pin engaged with the engagement holes of the master links;
   machining, with the machining center, gear teeth portions of the first and second master links using a plurality of machining tools selected from a ball end mill, a flat end mill, and a chamfer end mill.

2. The method of machining a master link as set forth in claim 1,
   wherein said securing the first or second master links to the second clamping jig, is performed by means of bolts and washers after engaging the master links with the horizontally-oriented integral pin secured to a reference pin supporter of the second clamping jig via the engagement holes of the master links to perform said machining of said gear teeth portions of the first and second master links; and
   wherein the method further comprises adjusting an angle block for adjusting a horizontal degree and a vertical degree of an upper machining portion of each master link secured to the horizontally-oriented integral pin by using an adjusting screw.

3. The method of machining a master link as set forth in claim 1,
   wherein said machining is performed by and in the following order of:
   machining interference groove portions in the gear teeth portions of the first and second master links using a ball end mill;
   machining upper end portions in the gear teeth portions of the first and second master links using a flat end mill; and
   removing by machining sharp edge portions in the gear teeth portions of the first and second master links using a chamfer end mill.

\* \* \* \* \*